United States Patent [19]

Schulz-Hennig et al.

[11] Patent Number: 4,707,597

[45] Date of Patent: Nov. 17, 1987

[54] METHOD AND APPARATUS FOR ACOUSTIC SUPERVISION OF ADJUSTMENT OPERATIONS AT OPTICAL DEVICES

[75] Inventors: Joerg Schulz-Hennig, Heikendorf, Fed. Rep. of Germany; Horst Sievers, Preetz, both of

[73] Assignee: Ing. Rudolf Hell GmbH, Fed. Rep. of Germany

[21] Appl. No.: 743,370

[22] Filed: Jun. 11, 1985

[30] Foreign Application Priority Data

Jun. 18, 1984 [EP] European Pat. Off. ........ 84 106944.6

[51] Int. Cl.$^4$ ............................................. G01B 11/26
[52] U.S. Cl. ................................... 250/209; 356/141; 356/152; 356/400
[58] Field of Search ........................ 250/201, 209, 214; 356/375, 376, 379, 380, 385–387, 5, 152, 141, 400

[56] References Cited

U.S. PATENT DOCUMENTS

| | | | |
|---|---|---|---|
| 3,423,593 | 1/1969 | Chinnock | 250/201 |
| 3,723,013 | 3/1973 | Stirland et al. | 250/209 |
| 3,739,174 | 6/1973 | Gloge | 250/201 |
| 3,907,435 | 9/1975 | Roodvoets | 356/153 |
| 4,020,340 | 4/1977 | Cooke | 250/209 |
| 4,081,216 | 3/1978 | Cook | 356/256 |
| 4,126,834 | 11/1978 | Coppock | 332/7.51 |
| 4,603,975 | 8/1986 | Cinzori | 356/152 |

FOREIGN PATENT DOCUMENTS 2521067 12/1975 Fed. Rep. of Germany .......... 356/5
2850743 5/1980 Fed. Rep. of Germany .
3151834 8/1982 Fed. Rep. of Germany .

OTHER PUBLICATIONS

Applied Optics, vol. 18, No. 17, Sep. 1, 1979, "Acoustooptic Modulator Intensity Servo" by Howard P. Layer, pp. 2947–2949.

Primary Examiner—Edward P. Westin
Assistant Examiner—Charles Wieland
Attorney, Agent, or Firm—Hill, Van Santen, Steadman & Simpson

[57] ABSTRACT

The present invention relates to a method and to an apparatus for acoustic supervision of the adjustment of a light bundle with respect to position and/or direction. A measuring surface lying in the beam path of the light bundle is divided into sectors. Apexes of centering angles of the sectors define a rated position. Light components of the light bundle incident into the individual sectors are measured opto-electronically as a measure of the positional deviations. Oscillations are generated for the individual sectors. Respective parameters of the oscillations are modified dependent on the measured positional deviations, and the modified oscillations are made audible as measuring tones. For the directional adjustment of the light bundle, the light bundle is focused onto the measuring surface whereby apexes of the centering angles of the sectors define the point of penetration of the rated direction through the measuring surface.

15 Claims, 2 Drawing Figures

METHOD AND APPARATUS FOR ACOUSTIC SUPERVISION OF ADJUSTMENT OPERATIONS AT OPTICAL DEVICES

RELATED APPLICATIONS

The following applications of the same inventors are related to the instant application: "Method And Apparatus For Acoustic Supervision Of Adjustment Operations at Optical Devices", Ser. No. 743,514 filed June 11, 1985; and "Method And Apparatus For Acoustic Supervision Of Adjustment Operations At Optical Devices", Ser. No. 743,516 filed June 11, 1985.

BACKGROUND OF THE INVENTION

The present invention relates to the field of imaging optics and laser optics, and relates to optical devices wherein the optical axis of a light bundle must be adjusted with respect to attitude and/or direction.

The intensity distribution, the attitude, or the direction of a light bundle is influenced by optical components such as mirrors, deflecting prisms, lenses, optically transparent plane-parallel plates and wedge plates, groove gratings, holographic deflecting diaphragms, acoustic multi-frequency modulators or acoustic-optical reflectors. Finally, the light source itself can be moved. The adjustment of a light bundle with respect to its intensity distribution, its attitude or its direction occurs by means of suitable adjustment means in the form of mechanical adjustments such as mirror mounts, or in the form of electro-mechanical adjustments such as piezo drives.

It is known for supervising the adjustment of a light bundle to observe gauges such as targets, screens or apertured diaphragms during the adjustment operation or to make the signals of suitable photo detectors visible, for example on an oscilloscope.

In many instances, however, the known adjustment aids are not precise enough, sometimes do not supply an unequivocal statement regarding an optimum adjustment, and are occasionally difficult to manipulate. Due, for example, to the exposed position of an adjustment means or to the compact structure of an optical device, also it is frequently not possible to simultaneously undertake a precise observation or supervision of the occurring adjustment during the adjustment operation.

SUMMARY OF THE INVENTION

It is therefore an object of the invention to specify a method and an apparatus for acoustic supervision of the adjustment of the optical axis of a light bundle with respect to attitude and/or direction with whose assistance the adjustment can be more easily and precisely executed and with which, moreover, the required steps for the optical adjustment are signalled in terms of size and direction.

According to the invention this object is achieved by providing a method for acoustic supervision of positional adjustment of an optical axis of a light beam to a rated point wherein a measuring surface lying in a beam path of the light bundle is divided into sectors so that apexes of centering angles of the sectors lie at the rated point. Light components of the light bundle incident into the individual sectors of the measuring surface are opto-electronically measured so as to represent a positional deviation of the optical axis of the light bundle in the individual sectors from the rated point. Different oscillations are generated for the individual sectors of the measuring surface. Parameters of the oscillations are modified dependent on the measured light components in the allocated sectors. The parameter-modified oscillations are made audible as measuring tones characteristic for the individual sectors.

In a method according to the invention for acoustic supervision of directional adjustment of an optical axis of a light bundle to a rated axis, the light bundle is focused to a measuring surface lying in the beam path. The measuring surface is divided into sectors so that intersections of centering angles of the sectors lie at a point of penetration of the rated axis through the measuring surface. Light components of the focused light bundle incident into the individual sectors of the measuring surface are opto-electronically measured so as to represent directional deviations of the optical axis of the light beam in individual sectors from the rated axis. Different oscillations are generated for the individual sectors of the measuring surface. Parameters of the oscillations are modified dependent on the measured light components in the allocated sectors. The parameter-modified oscillations are made audible as measuring tones characteristic for the individual sectors.

DESCRIPTION OF THE PREFERRED EMBODIMENTS

Figure 1:
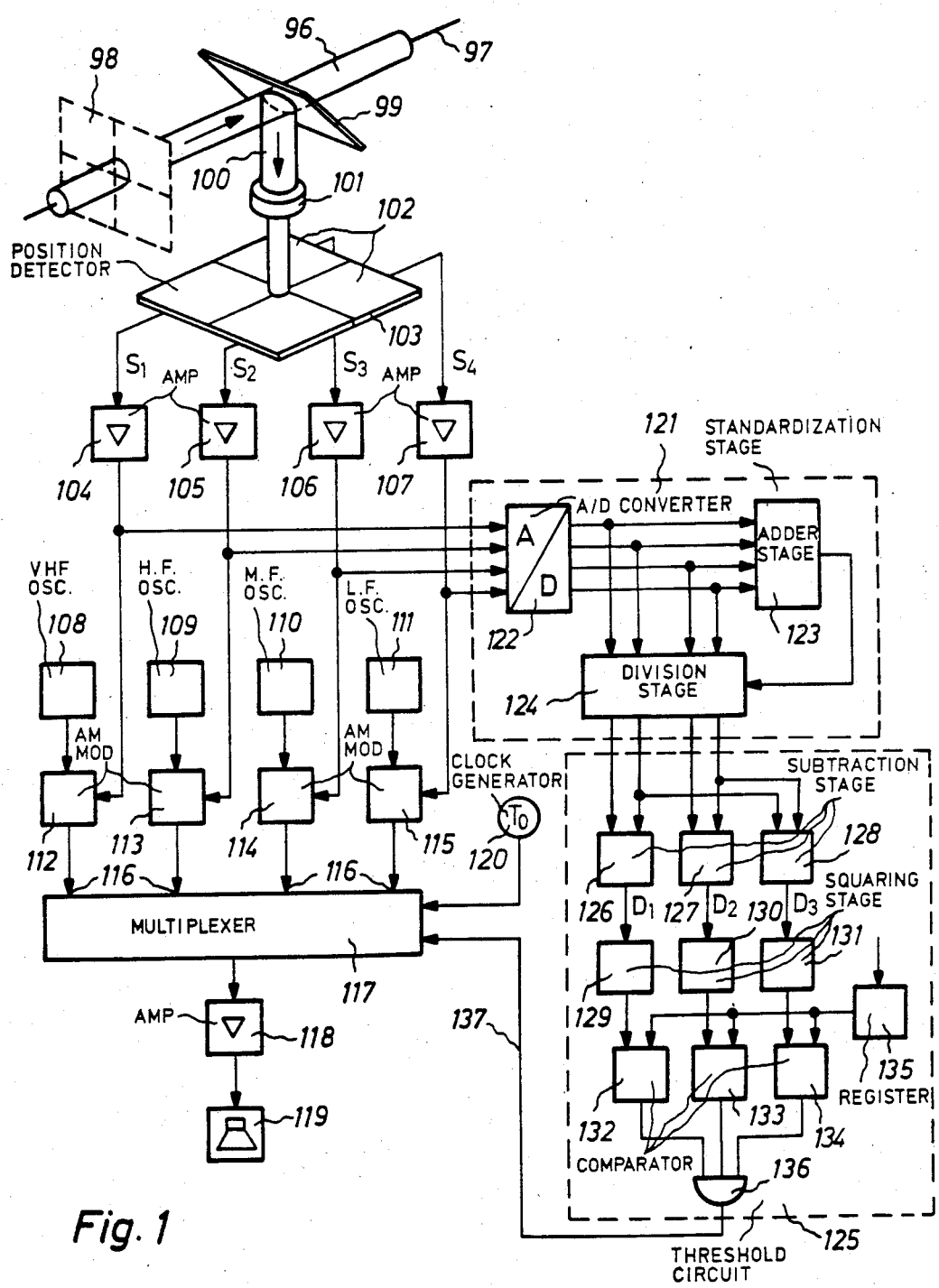
FIG. 1 is an exemplary embodiment of an apparatus for the acoustic supervision of the adjustment of the attitude of the optical axis of a light bundle.

FIG. 1 shows an exemplary embodiment of an apparatus for acoustic supervision of the adjustment of a light bundle with respect to its spatial attitude in a prescribed reference plane at right angles to the optical axis of the light bundle.

A light bundle 96 whose light source and adjustment means for positional correction are again now shown should lie in the center of a reference plane 98 lying at right angles to the optical axis 97 of the light bundle 96.

For identifying the position of the light bundle 96, a component light beam 100 is mirrored out by means of a partially transmitting planar mirror 99 in the beam path of the light bundle 96 and is imaged with the assistance of an adaptation optics 101 on the measuring surface 102 of a position detector 103. The adaptation optics 101 is, for example, an afocal telescope in order to adapt the cross-sectional area of the component light beam 100 to the size of the measuring surface 102. The measuring surface 102 can also be disposed in the beam path of the light bundle 96.

The measuring surface 102 of the position detector 103 is the conjugate of the reference plane 92, whereby it is assured that only a positional shift, but not an angular or direction change of the light bundle 96, causes a corresponding positional shift of the component light beam 100 in the measuring plane 102. Such positional shifts can, for example, be executed with the assistance of mirrors or prisms introduced into the beam path. The position detector 103 is composed of four electrically separated opto-electronic transducers whose light entry faces from the four quadrants of the measuring surface 102, and wherein the center of the measuring surface 102 corresponds to the rated position of the light bundle 96 in the reference plane 98. A quadrant photo diode can be advantageously employed as the position detector.

The four output signals $S_1$, $S_2$, $S_3$, and $S_4$ for the four quadrants of the position detector 103 which are amplified in amplifiers 104, 105, 106 and 107 are a measure for the respective part of the component light bundle 100 which falls into the corresponding quadrant, and is thus a measure for the direction and size of the existing deviation from the rated position.

The four quadrants of the position detector 103 have four oscillators 108, 109, 110, and 111 allocated to them which generate oscillations having different frequencies of the audible spectrum. The oscillator 108 generates an oscillation having a very high frequency of, for example, 5 kHz; the oscillator 109 generates an oscillation having a high frequency of, for example, 1 kHz; the oscillator 110 generates an oscillation having a moderate frequency of, for example, 400 Hz; and the oscillator 111 generates an oscillation having a low frequency of, for example, 100 Hz.

In a next method step, one of the parameters of the four oscillations such as the frequency, the amplitude, the keying frequency, or the pulse duty ratio is modified dependent on the allocated output signals $S_1$, $S_2$, $S_3$, and $S_4$. The four modified oscillations are made audible as different measuring tones whose pitch, volume, interruption frequency, or interruption duration depend on the identified position of the light bundle 96.

In the exemplary embodiment, the four oscillations of the oscillators 108, 109, 110, and 111 are amplitude-modulated in following amplitude modulators 112, 113, 114, and 115 dependent on the amplified output signals $S_1$, $S_2$, $S_3$, and $S_4$ of the position detector 103, and are supplied to the inputs 116 of a multiplexer 117. The multiplexer 117 successively connects the four amplitude-modulated oscillations in a cyclical sequence via an amplifier 118 to an electro-acoustical transducer, for example to a loudspeaker 119 which makes the oscillations audible as successive measuring tones. The cyclical change-over of the oscillations is controlled by a clock generator 120 which supplies a corresponding clock sequence $T_0$ to the multiplexer 117.

The amplified output signals $S_1$, $S_2$, $S_3$, and $S_4$ of the position detector 103 are simultaneously standardized in a standardization stage 121. For the information of the standardized output signals $\overline{S}_1$, $\overline{S}_2$, $\overline{S}_3$, and $\overline{S}_4$, the output signals $\overline{S}_1$, $\overline{S}_2$, $\overline{S}_3$, and $\overline{S}_4$ digitized in an A/D converter 122 are added in an adder stage 123 of the standardization stage 121 to form a sum value $\Sigma S$, and are divided in a division stage 124 by the sum value $\Sigma S$.

The standardized output signals $\overline{S}_1$, $\overline{S}_2$, $\overline{S}_3$, and $\overline{S}_4$ are supplied to a threshold circuit 125. In these subtraction stages 126, 127, and 128 in the threshold circuit 125, three standardized differential signals $\overline{D}_1$, $\overline{D}_2$, and $\overline{D}_3$ are identified from the first and second, from the third and fourth, and from the second and fourth standardized output signals S, and are modified according to a prescribed function. They are squared in a squaring stage 129, 130, and 131 in the exemplary embodiments. The standardized, squared differential signals $\overline{D}_1^2$, $\overline{D}_2^2$, and $\overline{D}_3^2$ are compared in comparators 132, 133, and 134 to a standardized limit value $\overline{D}_g$ which can be deposited in a register 135. The limit value $\overline{D}_g$ represents an allowed deviation of the light bundle 96 from its rated position. When a differential signal $\overline{D}^2$ falls below the prescribed, standardized limited value $\overline{D}_g$, then the corresonding comparator 132, 133, or 134 emits a signal with an H level. The outputs of the comparators 132, 133, and 134 are interrogated by an AND gate 136 which emits a signal with a logical H level at its output when all three standardized and squared differential values $\overline{D}^2$ have fallen below the standardized limit value $\overline{D}_g$. In this case, the output signal of the AND gate 136 on a line 137 causes all inputs of the multiplexer 117 to be connected through to the output, whereby all four measuring tones become simultaneously audible.

During the adjustment of the position of the light bundle, the different tonal pitches of the four measuring tones thus supply an indication as to the direction, and the different volumes supply an indication with respect to the amounts of the positional deviations, whereby, given a symmetrical adjustment of the light bundle 96 into its rated position, all four measuring tones are simultaneously audible with the same volume.

The generation of the measuring tones is not restricted to the described exemplary embodiment.

Figure 2:
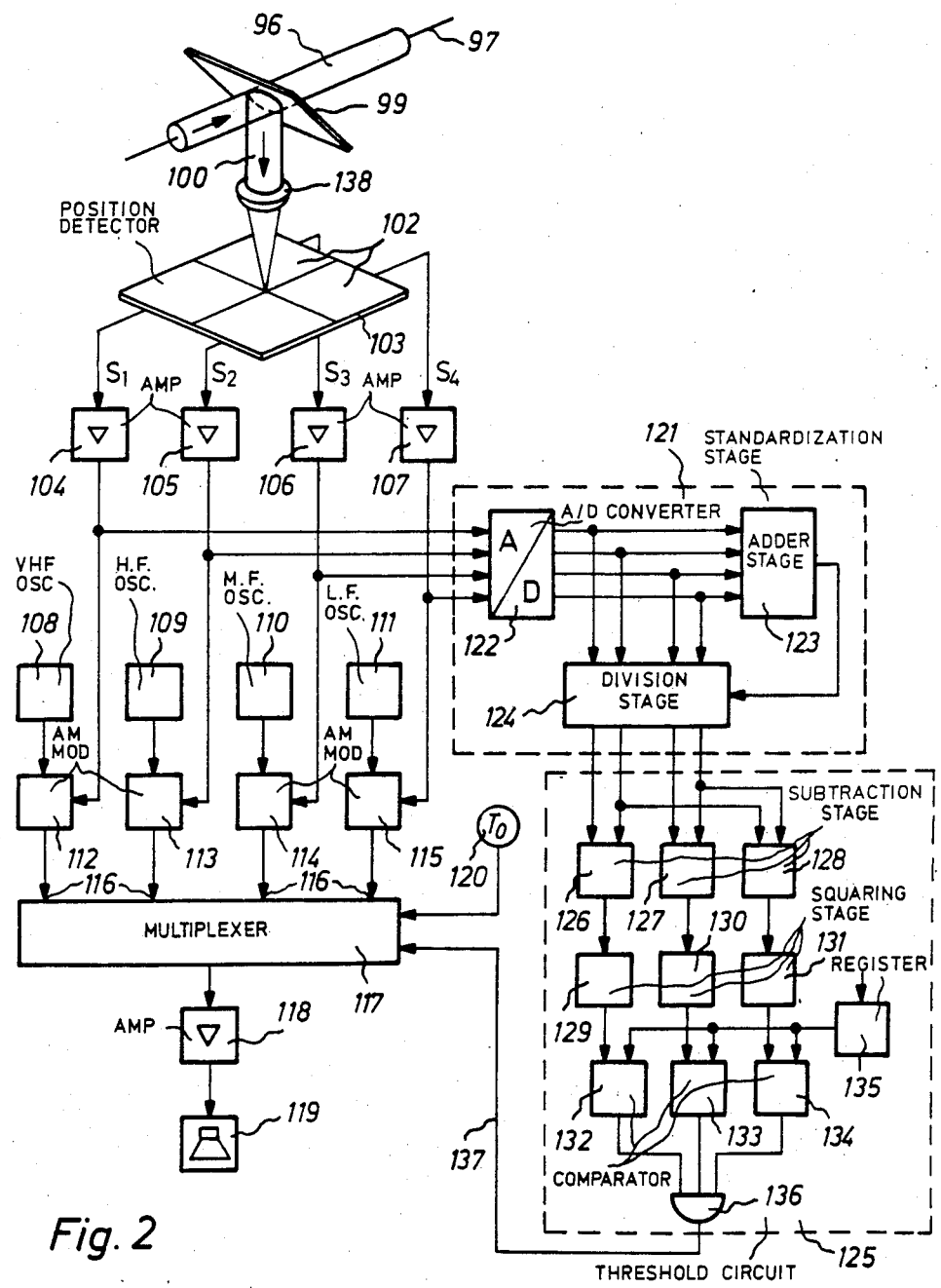
FIG. 2 is an exemplary embodiment of an apparatus for acoustic supervision of the adjustment of the direction of a light bundle.

FIG. 2 shows an exemplary embodiment of an apparatus for the acoustic supervision of the adjustment of the direction or of the angle of the light bundle 96 relative to a prescribed optical axis. This apparatus differs from the apparatus shown in FIG. 1 only in that the adaptation optics 101 is replaced by a focusing optics 138. By means of this optics 138, the component light beam 101 is focused on the measuring surface 102 of the position detector 103 such that only directional changes, but not parallel shifts of the light bundle cause a positional change of the light distribution on the measuring surface 102 of the position detector 103.

For simultaneous acoustic supervision of the position and angle adjustment of a light bundle, the apparatus of FIGS. 1 and 2 can also be advantageously combined to form one unit. Output signals S of the position detector 103 according to FIG. 1 are employed for positional measurement. They are amplified in the amplifiers 104, 105, 106 and 107, and the four output signals of the position detector 103 according to FIG. 2 employed for the angular measurement are optionally switched by means of a change-over to the amplitude modulator 112, 113, 114, and 115 and to the standardizations stage 121. Before this occurs, the change-over to the position or of the angle measuring unit to the signal evaluation circuit by means of the change-over can occur manually or automatically in cyclical alteration by means of a time generator.

Whereas the described apparatus require an adjustment instruction with a table in order to execute suitable adjustment techniques given defined measuring tones or tonal progressions, defined digital memory contents can be red out from a demodulator instead of generating measuring tones. Tonal progressions are generated with these digital memory contents via amplifiers and loud speakers which are identified by the operator as instructions in human language.

If, instead of the relative position and/or direction of the light bundle, the absolue position and/or direction is nonetheless of interest, the standardization stage 121 is bridged or can be entirely eliminated. An absolute limit value is then loaded into the register 135 of the threshold circuit 125.

Although various minor changes and modifications might be proposed by those skilled in the art, it will be understood that we wish to include within the claims of the patent warranted hereon all such changes and modifications as reasonably come within our contribution of the art.

We claim as our invention:

1. A method for acoustic supervision of positional adjustment of an optical axis of a light bundle to a nominal point, comprising steps of:
   dividing a measuring surface lying in a light path of the light bundle into sectors so that apexes of centering angles of the sectors lie at the nominal point;
   generating electrical measuring signals derived from each of the individual sectors of the measuring surface by opto-electronically measuring portions of the light bundle incident into said sectors;
   generating an audible oscillation signal for each of the sectors;
   varying for all of the oscillation signals one of the parameters selected from the group consisting of frequency, amplitude, keying frequency, and pulse duty factor;
   said one parameter being differently varied for each oscillation signal and corresponding sector so it uniquely identifies its respective sector;
   varying another parameter for each of the oscillation signals, said another parameter being selected from said same group but being other than said one parameter, said another parameter varying in correspondence with an amplitude of the electrical measuring signals generated by the portion of the light bundle in the corresonding sector, said one parameter of the oscillation signal being indicative of the individual sectors and said second parameter being indicative of a positional deviation of the optical axis from said nominal point during adjustment;
   forming differential signals D from said oscillation signals of at least two different sectors;
   comparing the differential signals D to a given limit value $D_g$; and
   if the limit value $D_g$ is crossed, providing an audible indication thereof.

2. A method according to claim 1 wherein said one parameter is frequency and said another parameter is amplitude.

3. A method according to claim 1 including a step of making audible said oscillations as measuring tones in successive cyclical sequence.

4. A method according to claim 1 including steps of:
   (a) forming said differential signals D from said electrical measuring signals of neighboring and opposite sectors of said measuring surface;
   (b) comparing the differential signals D to said prescribed limit value $D_g$ which represents an allowed positional deviation value of the optical axis from said nominal point; and
   (c) changing all of the audible oscillation signals given a crossing of the limit value $D_g$ by said differential signals D.

5. A method according to claim 4 wherein said oscillations are made audible as measuring tones in successive cyclical sequence and wherein said cyclical sequence is interrupted given a crossing of the limit value $D_g$, at which time all measuring tones are made audible simultaneously.

6. A method according to claim 1 including a step of standardizing said electrical measuring signals.

7. A method according to claim 4 including a step of modifying the differential signals D according to a prescribed function.

8. A method according to claim 1 including a step of positioning an adaption optics in front of the measuring surface in the light path of the light bundle so as to adapt a cross-sectional area of the light bundle to said measuring surface.

9. A method for acoustic supervision of positional adjustment of an optical axis of a light bundle to a nominal point, comprising steps of:
   dividing a measuring surface lying in a light path of the light bundle into sectors so that apexes of centering angles of the sectors lie at the nominal point;
   generating electrical measuring signals derived from each of the individual sectors of the measuring surface by opto-electronically measuring portions of the light bundle incident into said sectors;
   generating an audible oscillation signal for each of the sectors;
   providing a different frequency for each of the oscillation signals so each oscillation uniquely identifies its respective sector;
   varying an amplitude of each of the oscillation signals in correspondence with an amplitude of the electrical measuring signals generated by the portion of the light bundle in the corresponding sector, said frequency of the oscillation signals being indicative of the individual sectors and said varying amplitude being indicative of a positional deviation of the optical axis of said nominal point during adjustment; and
   indicating that a derived positioning has been attained by forming differential signals from the oscillation signals, comparing the differential signals to a threshold value, and given crossing of the threshold value, providing an audible indication thereof.

10. An apparatus for acoustic supervision of positional adjustment of an optical axis of a light bundle to a nominal point, comprising:
    a measuring surface lying in a light path of the light bundle and which is divided into sectors so that apexes of centering angles of the sectors lie at the nominal point;
    opto-electronic means for generating electrical measuring signals derived from each of the individual sectors of the measuring surface by opto-electronically measuring portions of the light bundle incident into said sectors;
    means for generating for each of the sectors an audible oscillation signal of different frequency for each of the sectors so as to uniquely identify the sectors;
    means for varying an amplitude for each of the oscillation signals in correspondence with an amplitude of the electrical measuring signals generated by the portion of the light bundle in the corresponding sector, said one parameter of the oscillation signals being indicative of the individual sectors and said second parameter being indicative of a positional deviation of the optical axis from said nominal point during adjustment; and
    means for indicating that a desired positioning has been attained by forming differential signals from the oscillation signals, comparing the differential signals to a threshold value, and given crossing of the threshold value, providing an audible indication thereof.

11. An apparatus according to claim 10 wherein multiplexer means are connected to receive said oscillations for cyclically connecting through said oscillations to a sound transducer.

12. An apparatus according to claim 11 wherein a threshold circuit means is connected to the opto-electronic means for comparison of said measuring signals to a limit value, and an output of the threshold circuit means being connected to control said multiplexer means for connecting through one or more of said oscillation signals.

13. An apparatus according to claim 12 wherein said threshold circuit means comprises:
   differentiation stage means for formation of differential signals from the measuring signals;
   a register means for prescribing said limit value; and
   a comparator means communicating with the differentiation stage means and with the register means for formation of the control signal given downward transgression of the prescribed limit value by the differential values.

14. An apparatus according to claim 12 wherein a standardization stage means is disposed between the opto-electronic means and the threshold circuit means for standardizing the measuring signals.

15. An apparatus according to claim 13 wherein function modification stage means for modification of the differential signals according to a prescribable function is disposed between the differentiation stage means and the comparator means.

* * * * *

UNITED STATES PATENT AND TRADEMARK OFFICE
CERTIFICATE OF CORRECTION

PATENT NO. : 4,707,597

DATED : November 17, 1987

INVENTOR(S) : Georg Schulz-Hennig et al

It is certified that error appears in the above—identified patent and that said Letters Patent is hereby corrected as shown below:

On the face of the patent, at [73], please change the name of the Assignee from "Ing. Rudolf Hell GmbH" to --Dr.-Ing. Rudolf Hell GmbH"

Signed and Sealed this

Twelfth Day of April, 1988

Attest:

DONALD J. QUIGG

Attesting Officer

Commissioner of Patents and Trademarks